US006688717B2

(12) United States Patent
Chang et al.

(10) Patent No.: US 6,688,717 B2
(45) **Date of Patent: *Feb. 10, 2004**

(54) PRINTED MEDIUM WITH INTEGRAL IMAGE LOCATOR AND METHOD

(75) Inventors: Terence Chee Sung Chang, Poway, CA (US); James Robert Schmedake, San Diego, CA (US); William E. Bland, Cardiff-by-the-Sea, CA (US); Hongsheng Zhang, San Diego, CA (US); Herb Sarnoff, Escondido, CA (US)

(73) Assignees: Eastman Kodak Company, Rochester, NY (US); Hewlett-Packard Development Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/246,190

(22) Filed: Sep. 18, 2002

(65) Prior Publication Data

US 2003/0107640 A1 Jun. 12, 2003

Related U.S. Application Data

(63) Continuation of application No. 10/020,397, filed on Dec. 12, 2001, now Pat. No. 6,536,892.

(51) Int. Cl.[7] .......................... B41J 29/38; B41J 3/407; G01D 9/28; G01D 9/36

(52) U.S. Cl. ........................... 347/16; 347/106; 346/23

(58) Field of Search ................................ 347/101, 105, 347/16, 35, 104, 5, 106; 355/40; 283/67; 346/23

(56) References Cited

U.S. PATENT DOCUMENTS

| | | | | |
|---|---|---|---|---|
| 5,270,728 | A | 12/1993 | Lund et al. | |
| 5,382,508 | A | 1/1995 | Ikenoue | |
| 6,173,992 | B1 | 1/2001 | Manico et al. | |
| 6,536,892 | B1 * | 3/2003 | Chang et al. | 347/101 |

* cited by examiner

*Primary Examiner*—Stephen D. Meier
*Assistant Examiner*—Michael S Brooke
(74) *Attorney, Agent, or Firm*—Stephen B. Salai; Roger Aceto; Harter, Secrest & Emery LLP

(57) ABSTRACT

A sheet of inkjet printed photographic images having orthogonal fiducial marks extending along a leading edge of the printed field and along a lateral side of the printed field. The fiducial marks register with the printed field and provide information regarding the location of the images in the printed field relative to the larger sheet. The registration of the lateral side fiducial mark and print field is accomplished by exercising the nozzles of the print head at each pass of the print head during the printing of the photographic image.

10 Claims, 4 Drawing Sheets

PRINTED MEDIUM WITH INTEGRAL IMAGE LOCATOR AND METHOD

CROSS REFERENCE TO RELATED CASES

This application is a continuation of Ser. No. 10/020,397 filed Dec. 12, 2001 entitled "Printed Medium with Integral Image Locator and Method", now U.S. Pat. No. 6,536,892 and is related to copending application Ser. No. 09/995,092, filed Nov. 27, 2001 and entitled "Cutter System for Multi Size Photographic Prints", and to copending application Ser. No. 10/032,919 filed Dec. 28, 2001 entitled "Method of Exercising Nozzles of an Inkjet Printer and Article", now U.S. Pat No. 6,505,906.

TECHNICAL FIELD

The present invention relates generally to photofinishing including a printer to produce a print medium such as a sheet of photographs that is subsequently cut into individual photos. More particularly the invention relates to a print medium having integral fiducial marks acting as an image locator for improving the accuracy of cutting the individual photos from the larger sheet of print medium.

BACKGROUND OF THE INVENTION

In photofinishing operations it is conventional to develop and print photographs on roll stock photographic paper having a width that generally accommodates one size of print. After printing out a roll of photos on a piece of the roll stock, the printed piece is cut to provide the individual prints each cut severing one of the prints from the strip. Dedicating a given width of roll stock to the production of a given size photo is less flexible for fulfilling print orders and slows throughput. It requires the photofinishing operation either to have multiple machines, each dedicated to a given size of photo or it places a burden on the operator to change the print media from one size to another after completing orders.

Advancements in photofinishing allow for the production of photographs by ink jet printers, laser printers and other photofinishing printer systems not dependent upon traditional wet chemistry. Such printers for example produce the image from a digital memory. Moreover, the use of computers in connection with these advancements allows for further improvement. For example, with a computer controlled printer it is not necessary to use roll stock having the width of a desired finished photo. A photofinishing printer now can generate photos of various sizes on a single sheet of print media. Also the images can be manipulated to arrange multiple images on a single larger sheet. The single sheet then is cut longitudinally and transversely to separate the individual photographs.

Most inkjet print heads encounter several problems if left unused out in the atmosphere. Chemical components in the ink slowly evaporate from the exposed meniscus at each nozzle causing the ink to locally increase in viscosity, become increasingly concentrated with dye, or otherwise be inconsistent with the bulk ink properties. If left unchecked, the printing resulting from using these aged nozzles would result in decreased image quality. To prevent these problems, new print heads are shipped with tape covering the nozzle plate that is removed when the print head is installed. During operation, a capping station within the printer seals the nozzle plate, preventing evaporation of the ink during periods of inactivity. For inks with an especially short decap time, the nozzles must be fired periodically when the printer is uncapped.

A most convenient way to keep nozzles "fresh" is to occasionally spit from every nozzle into a single spittoon located at a service station a few centimeters away from the printed image. This does not present a productivity issue in conventional operations because even when printing in a high quality mode on special paper, the action is taken infrequently. For example the action may be taken after every few pages are printed. However, in a commercial photofinishing operation, the nozzles must be freshened more frequently. This is because commercial photographic printing must be of the highest quality and defects at the print edges are not tolerated. Also, print quality must be maintained in various different environmental conditions and it is understood that nozzles must be exercised more in cold and dry environments than in humid environments.

As an alternative, the nozzles can be exercised by firing onto the print medium during printing. This allows a more consistent production since it avoids the delays associated with interrupting the printing operation and indexing the print head to a distant spittoon.

After printing and when cutting single images from a larger sheet there are several sources of errors such as off set errors that contribute to inaccuracies in making the several cuts necessary to produce the single image. For example, the printer can misalign the images on the larger sheet of print medium. Mechanism skew, drive roller tolerance, cutter positioning errors and resolution also contribute to cutting errors. To some extent over-printing the images to a size slightly larger than the finished photograph size can compensate for these errors. By over-printing, portions of the image can be removed during cutting without materially altering the image.

Mechanical sensors for detecting the edge of the sheet also can remedy these errors to some extent. However, errors associated with mechanical paper edge sensors are large. Often the tolerance inherent with mechanical edge sensors is larger than the plus or minus 1.0 mm of over-printing commonly used.

Accordingly, an object of the present invention is to provide improvement in the detecting of the location of an image printed on a larger sheet.

Another object of the present invention is to provide a segment of a printed medium having integral fiducial marks for indicating the location of printed images on a larger sheet.

Yet another object of the present invention is to provide an improvement in the finished cut dimensions of the finished photograph.

Still another object of the present invention is to provide a sheet having detectable fiducial marks that identifies the location of one or more printed images on the sheet.

A further object of the present invention is to provide a fiducial registration arrangement for a sheet containing one or more images generated by printing from a digital file.

SUMMARY OF THE INVENTION

In the present invention an inkjet printer, laser printer or the like is used to print one or more photographs onto a larger sheet, preferably photographic paper. The photographs are generated from a digital file and a computer is programmed to array the images on the sheet to best utilize the space available. Where image size and number permit, the photographs can be arrayed in aligned transverse rows and aligned longitudinal columns. Preferably, the print sizes are selected and arranged on the sheet so that all the prints in any given row have aligned leading and trailing edges. The computer further generates the location of fiducial marks relative to the array of images and these fiducial marks are printed together with the photographic images. Preferably, two fiducial marks are printed together with the images. A first fiducial mark extends across the leading edge of the sheet in advance of a first row of photographic images. A second fiducial mark is printed along a lateral edge of the sheet and orthogonal to the first fiducial mark so fiducial marks along two axes are formed.

The printing of the fiducial marks is accomplished by an exercise of the print head nozzles. The marks are printed in a known size and a known distance from the images printed on the print medium and from other locations such as the edges of the printing medium. The printed marks preferably are composed of a combination of subtractive printing colors of each of the colors contained in the printing system. The amounts and relative ratios of each color used in the nozzle exercise are determined based on the specific necessity of each color to be exercised. For example, one color may require twice the number of nozzle firings relative to another color to remain healthy. The exercise of individual nozzles in the print head also can be controlled to maximize the sensing of the fiducial mark by an optical sensor or the like. In this case the nozzles for particular colors such as black or cyan, can be exercised so as to sharpen and make crisp, the outer edges of the fiducial marks whereas other nozzles can be exercised to form the body of the fiducial marks between the outer edges.

The fiducial marks are printed along with the photographic images using the same print heads. This assures that there is a registration of the fiducial marks and the images. Knowing the exactness of the registration allows the detection of the fiducial marks to more accurately indicate the location of the images. When the fiducial mark is detected, a cutter can utilize the information as to the location of the fiducial mark to reduce the magnitude of the offset error of the print and position the sheet so as to locate an adjacent edge of the photographic image at a cutting location. The cutter mechanism can determine the gain error, due to variations in drive rollers, by measuring the distance between two fiducial marks a fixed distance apart, and adding a compensation factor, either dynamically or with a calibration print. Also, because the fiducial marks are printed in concert with the printing of the individual images, any skew of the image is matched by a comparable skew of the orthogonal fiducial marks. The image skew can be measured by adding another parallel sensor in either or both axis. The cutter can then accommodate the positioning of the sheet to compensate for this skew so a proper cut can be made. In a similar fashion, compensation for other errors in alignment can be made due to the registration between the printed images and the printed fiducial marks.

Accordingly, the present invention may be characterized in one aspect thereof by a segment of print medium having transverse leading and trailing edges and opposite side longitudinal edges. The segment of the print medium has a printable surface for receiving the inkjet output of a print head and the segment comprising:

a) a photographic image on the printable surface generated by the print head, the photographic image having orthogonally disposed first and second edges;

b) a first fiducial mark on the printable surface generated by the print head and extending across the segment between the segment leading edge and the image first edge, the first edge being in registry with the first fiducial mark;

c) a second fiducial mark on the printable surface generated by the print head and extending laterally along the segment between a first lateral side edge of the segment and the second edge of the image, the second edge being in registry with the second fiducial mark and the first and second fiducial marks being orthogonally arranged; and d) the first and second fiducial marks being formed together with the photographic image by the same print head as used to generate the image.

In another aspect, the invention may be characterized by a method of preparing a segment of print medium having leading and trailing edges and opposite lateral side edges comprising:

a) inkjet printing a first transverse fiducial mark across the segment adjacent the leading edge;

b) inkjet printing a photographic image having orthogonally disposed first and second edges on the print medium, the image first edge being in registry with the transverse fiducial mark; and c) inkjet printing together with the photographic image at least one lateral fiducial mark extending along the segment between a first lateral side edge of the print medium and the image second edge, the image second edge being in registry with the second fiducial mark and the fiducial marks being orthogonally disposed.

DETAILED DESCRIPTION OF THE INVENTION

Figure 1:
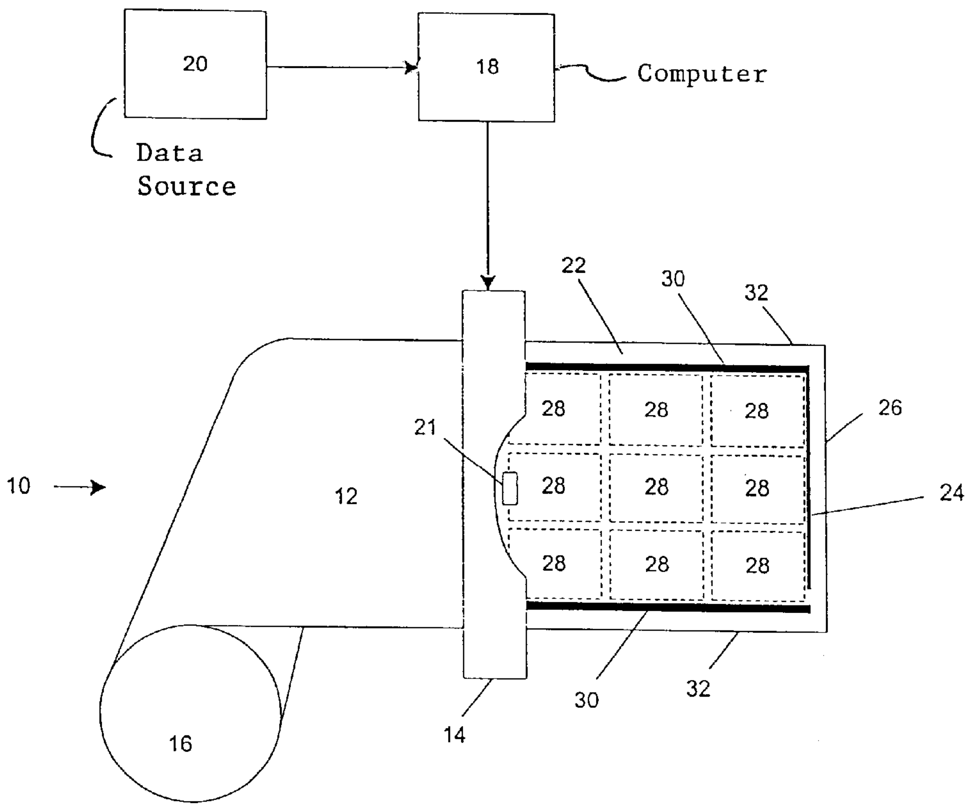
FIG. 1 is a schematic representation showing a photofinishing operation for the printing of photographic images and fiducial marks on a print medium.

Referring to the drawings FIG. 1 shows a schematic representation of a photofinishing system generally indicated at 10. The system performs a sequence of steps for printing a series of images on a print medium 12. The print medium comprises photographic paper or the like that is fed through a photofinishing printer 14 such as an inkjet printer. The print medium may comprise a plurality of stacked sheets that are individually fed into the printer. Preferably however, the print media is drawn from a roll 16 so that the printer has, in effect, a relatively continuous supply of the print media.

A computer 18, operatively connected to the printer, is arranged to receive photographic images contained by a data source 20. The data source can be any conventional image source including, but not limited to, a strip of photographic negatives, one or more actual photographic prints or other image that is scanned for input into the system. The data source also can be any digital representation of the images or other stored electronic or digital file that can be directly inputted into the photofinishing system.

In operation, the images to be printed first are received from a data source 20. The computer is programmed to organize a plurality of the photographic images received from the data source in an array that makes most efficient use of the space on the print medium. Also inputted into the system may be customer instructions indicating the number of copies of each image that is desired. It should be appreciated that the images themselves may be of varying sizes or the customer may request enlargements of one or more images. The customer's instructions also may include a request to skip the printing of certain images contained by the data source 20. In any event, after the customers instructions as to quantity, size, etc. is inputted into the system, computer 18 determines a printing layout for the given width of the print media.

In a typical print format for a print size of 4 in.×6 in. (10.16×15.24 cm), the prints are laid out three in a row to form a row extending across a paper width of 13 in. (31.85 cm). Each customer order may comprise one or more such rows. As the paper 12 passes through the printer 14, the print layout determined by the computer is printed onto the paper by a traversing print head 21 to produce a printed segment, a portion of which is identified at 22. The print head is conventional and need not be described in detail except to say that it comprises a plurality of nozzles (not shown) for directing drops of ink of different colors at the print medium to create the photographic images.

At the outset of the printing operation, the computer exercises the print head 21 to create a transverse fiducial mark 24, which may extend across the paper width and just below the leading transverse edge 26 of the segment. The transverse fiducial mark 24 preferably is a stripe of a single color and most preferably is a black stripe. The printed images 28 then immediately follow the transverse fiducial mark.

The print head 21 is further exercised as it makes repeated transverse passes back and forth across the paper to generate the images. The exercise can occur at the beginning of each transverse printing pass or at the start and end of each pass. Regardless of when the exercise occurs, at least one nozzle of the print head is used so that the print head ejects a series of ink drops just before and just after the printed image. This forms two longitudinal fiducial marks 30 along each longitudinal edge 32 of the paper between the edge and the photographic images 28. These marks form a printed pattern composed of a combination of primary subtractive printing colors. Each of the colors contained in the printing system is used with the amounts and relative ratios of each color being determined based on the specific necessity of each color to be exercised. The longitudinal fiducial marks formed by the nozzle exercise are of a known width and a known distance from each longitudinal edge 32 of the paper and the printing of the images 28 commences immediately after the longitudinal fiducial mark.

The longitudinal fiducial marks also can be made by selective exercise of nozzles in the print head. For example, to make the mark more distinctive to a sensor, such as an optical sensor, the outer edges of the marks can be formed by exercise of the nozzles associated with specific distinctive colors such as black or cyan. This will create sharp, crisp edges of the fiducial mark. In contrast, the interior of the fiducial marks between the outside edges are formed by exercise of the nozzles associated with other less distinctive colors.

Thus, with each transverse pass of the print head 21, a portion of each fiducial mark 30 and a portion of a printed image is formed. Preferably, each image is over printed by about one millimeter about all four sides and the images are printed with no space between each image. Accordingly, for a typical arrangement of three 4 in. (10.16 cm) wide prints arranged in a row across the segment, the two longitudinal fiducial marks are each 5.7 mm wide and 4 mm from the paper edge. In addition the 1.0 mm of overprinting adds 6 mm to the width of the printed field adding to the total paper width of 13 inches (33.02 cm). After the printing order is completed, the printed segment 22 is cut from the continuous supply by any appropriate cutter associated with the printer.

Figure 2:
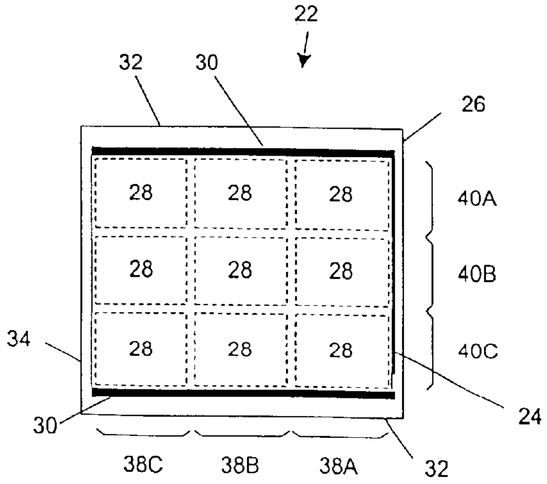
FIG. 2 illustrates a segment of print medium produced by the arrangement of FIG. 1.

A typical printed segment comprising a layout for nine 4×6 prints is shown in FIG. 2. In this respect the printed segment 22 severed from the paper supply has leading and trailing edges 26, 34 respectively and opposite lateral edges 32. The print head applied transverse fiducial mark 24 extends across the leading edge and immediately in advance of a printed field that is bounded on its lateral sides by the longitudinal printer fiducial marks 30. Thus the segment 22 as shown in FIG. 2 comprises an entire printed sheet and encompasses the entire printed field bounded on three sides by the leading edge fiducial mark 24 and the two longitudinal fiducial marks 30. Disposed in the print field is a set of images comprising individual photographs 28 that are shown in dotted line in this field because the over printing about the edges of each print merges with the over printing of an adjacent photo in the format as shown. In the format shown in FIG. 2, there are nine photographs in the set arranged in three transverse rows or subsegments 38A, B and C with the leading and trailing edges of the photographs in each row being aligned. The photographs also are arranged in three longitudinal columns 40A, B, C with the lateral edges of the photographs in each columns also being aligned.

Figure 3:
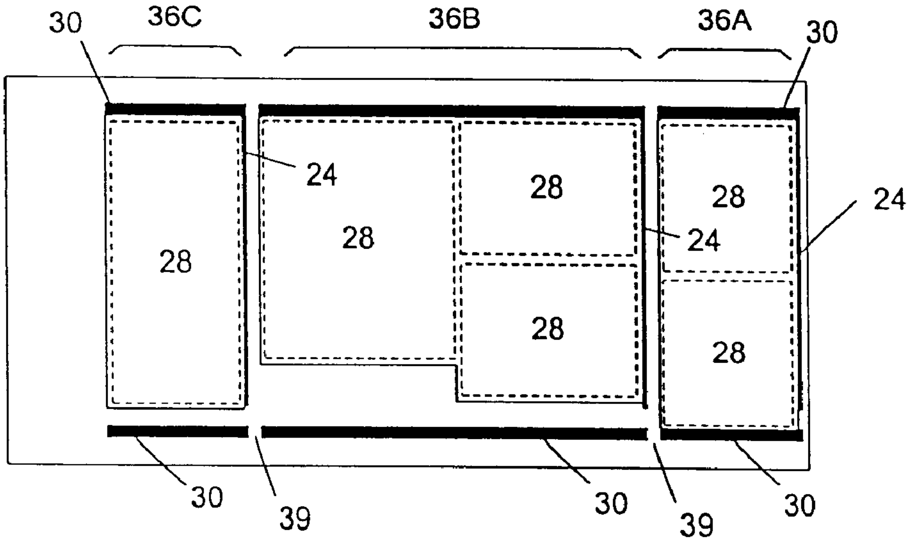
FIG. 3 is similar to FIG. 2 only showing another embodiment of the segment.

Other layouts are possible depending upon the arrangement created by the computer 18. For example, prints of various sizes can be grouped together so long as there is one dimension (either length or width) in common. This is shown in FIG. 3 wherein a plurality of photographs are arranged in three segments wherein the three segments are all on the same printed sheet. There is a first segment 36A containing only two prints, each over printed and with no space between. A second segment 36B contains three larger prints (also over printed and with no space between) and a third segment 36C contains one panoramic print. Each of the segments 36A, B and C comprise a printed field bounded on three sides by the transverse and longitudinal fiducial marks 24, 30 respectively. In this case however, the segments are short in that each comprises one or two rows of prints separated by white space 39. Preferably, the segments, which may be of various widths, are left side justified.

In some cases, processing shorter segments is advantageous, such as the end of a customer order. In such cases each of the short segments such segments 36A, B and C is separated by white space 39 and there is a transverse fiducial mark 24 immediately in advance of each segment. These segments are cut and separated from the larger sheet wherein each contains transverse and longitudinal fiducial marks to provide registration information.

Steps in an operation for cutting the segment 22 of FIG. 2 into individual prints is illustrated in FIG. 4. FIG. 4A shows that the segment first is advanced in into a cutter 41 in the direction of its leading edge 26. As a first step, any suitable sensor 42 in the cutter such as an optical sensor detects the transverse fiducial mark 24. Since the image immediately follows the transverse fiducial mark, the cutter is able to make a first transverse cut along a line 43. This forms a leading edge 44 of the photographs in the first row 38A as shown in FIG. 4B. The width the row of photographs 38A is known so that the cutter can now draw the segment into the cutter to a second position for making a second cut along a second line 45 that forms the trailing edge of the first row of prints. In this fashion a strip or subsegment 38A of the photographs cut to size is severed from the segment 22 as shown in FIG. 4C.

The severed subsegment 38A then is moved in the direction of a lateral edge 32 to a second cutter 46 (FIG. 4C) that is arranged orthogonal to the first cutter. This second cutter also includes a sensor 47, which detects the portion of the printer longitudinal fiducial mark 30 located between the lateral edge 32 and the printed images. The longitudinal fiducial mark thus forms a second fiducial mark arranged orthogonal the first fiducial mark 24. Since the photographic image in the row immediately follows the longitudinal fiducial mark, the cutter 46 is able to make a first longitudinal cut along a line 48 that forms a lateral edge of the first photograph in the row. The width of each photograph in the subsegment is known so that the cutter 46 can draw the subsegment to a second position for making a second cut along a second line 50 that forms the second lateral edge of a first print. In this fashion a first of the photographs 28 in the subsegment is severed from the sheet as shown in FIG. 4D.

Also it is known that the over printing can be fixed at 2 mm or can be sized to a dimension which is proportional to the size of each print. With this information cuter 46 can draw the remaining portion of the subsegment into the cutter by this distance so a third cut 52 can be made thereby forming a first lateral edge of a second print in the subsegment. Similar advances are made as noted above until all of the individual prints have been cut from the subsegment.

Figure 4A:
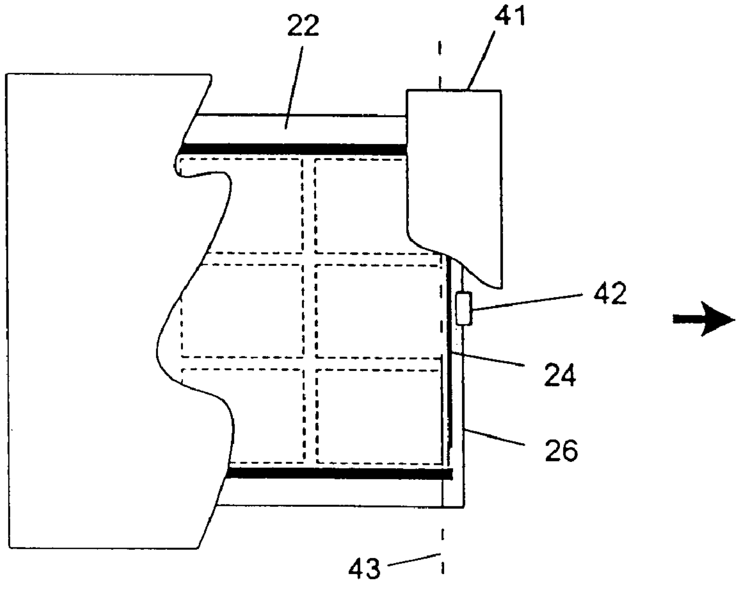
FIGS. 4A–D is a schematic representation showing steps in the cutting of the segment of FIG. 2 into separate photographs.
Figure 4B:
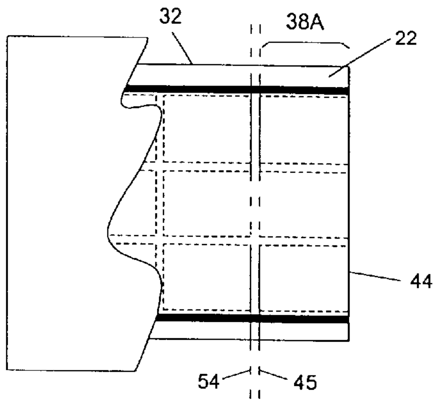
Figure 4C:
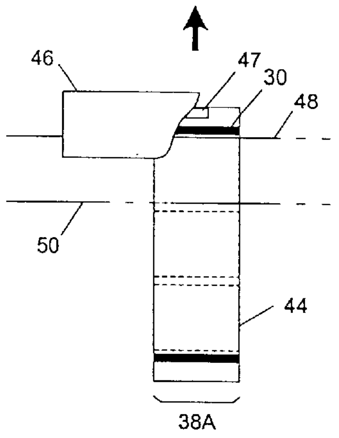
Figure 4D:
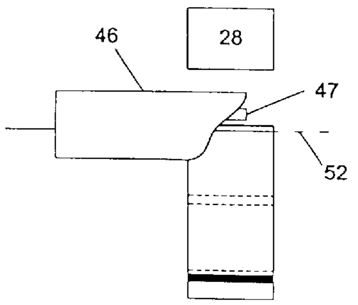

Either while the second cutter is performing its function or after the completion of its function, the first cutter 41 indexes the remaining portion of segment 22 by the amount of the over printing between the rows 38A and 38B (FIG. 4B). The cutter can now make a cut along a line 54 to form the leading edge of the photographs comprising row 38B. The cutting steps are then repeated first to sever a subsegment containing the row of photographs 38B from the sheet and then to cut the subsegment into individual photographs.

In the case of the arrangement shown in FIG. 3, each of the segments 36A, B, C first is separated from the remaining segments with a rough cut through the white space 39. Each of the separate segments in turn is delivered to a cuter where the first and second cuts 43, 45 (FIG. 4B) are made. Each of the segments then is moved laterally to a position for making the separate lateral cuts 48, 50 and 52 as necessary to sever the separate prints.

Figure 5:
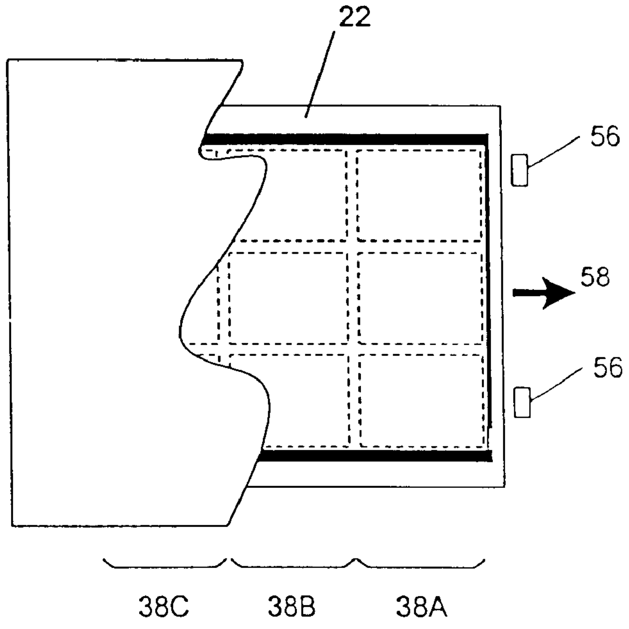
FIG. 5 is a view of a portion of the segment of FIG. 2 showing use of the fiducial marks to measure skew.

As noted above, the present invention is able to correct for various printing errors. For example, FIG. 5 illustrates the detection of skew in the transport of a segment 22 (or of a segment 36A, B or C of FIG. 3) to a cutting position. In this respect a pair of transversely spaced sensors 56 arranged so as to extend across the path of segment motion (indicated by arrow 58) can measure the angular skew of the fiducial mark 24. The transport mechanism (not shown) can then make an appropriate adjustment to compensate for the skew so that the segment is properly aligned with the cutter. A similar arrangement can correct for skew during the lateral transport of a subsegment to a cutter for severing individual prints from the subsegment.

Figure 6:
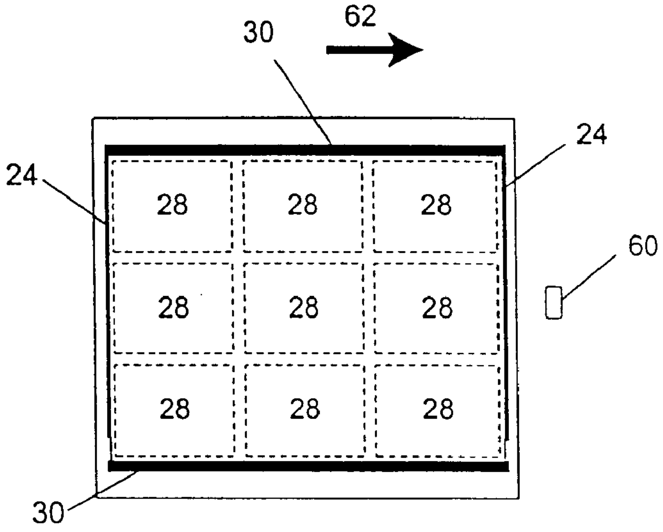
FIG. 6 shows another embodiment of the invention.

A further application of the present invention can be understood by reference to FIG. 6. FIG. 6 shows an arrangement of two spaced apart transverse fiducial marks 24. With the distance between the adjacent fiducial marks 24 being known, a single sensor indicated at 60 can be used to measure the distance between the fiducial marks as the larger sheet is moved in the direction of arrow 62. This longitudinal distance information is useful to provide for the calibration and correction of errors in the transport mechanisms used to move the larger sheet in a longitudinal direction to a cutting position. Such distance information also can be gleaned from any third fiducial mark located parallel to and spaced a known distance from the transverse mark 24. Similar information to calibrate and correct the transport mechanisms moving individual segments or subsegments in a lateral direction can be obtained by having a fourth fiducial mark parallel and spaced a known distance from either of the second fiducial marks 30.

Accordingly, it should be appreciated that the present invention accomplishes its intended objects. In this respect fiducial marks are provided on the print medium that are in registry with the printed images. These fiducial marks are formed by the exercise of the print head nozzles and serve to assist in the orientation and location the print medium at proper cutting positions for severing individual prints from the larger sheet. Moreover, exercising the nozzles of the print head to form the fiducial marks allows the nozzles to maintain freshness while serving the additional purpose of printing the fiducial marks. Since the fiducial marks are closely associated with the printed images, there is a resulting improvement both in detecting the location of the image on the larger sheet as well as improving the finished cut dimensions of the finished photograph. The present invention further provides a detectable fiducial registration arrangement able to identify the location of one or more printed images on the larger sheet.

Having described the invention in detail, what is claimed as new is:

1. A segment of print medium having transverse leading and trailing edges and opposite lateral side edges, the segment having a printable surface for receiving the inkjet output of a print head having a plurality of nozzles, the segment comprising:

a) a first photographic image on the printable surface generated by the print head, the photographic image having orthogonally disposed first and second edges;

b) a first fiducial registration mark on the printable surface generated by the print head and providing a reference for locating the image first edge with respect to the print medium leading edge; and c) a second fiducial registration mark on the printable surface generated by the print head and providing a reference for locating the second edge of the image with respect to a lateral side edge of the print medium.

2. A segment as in claim 1 wherein the first registration fiducial mark comprises a single color image.

3. A segment as in claim 1 wherein the second registration fiducial mark comprises a print pattern composed of multiple colors selected so as to exercise one or more selected nozzles of the print head.

4. A segment as in claim 3 wherein the second registration fiducial mark includes outer edges comprising the exercise of at least one nozzle of the print head associated with specific distinctive colors and an interior portion between the outer edges comprising the exercise of at least one nozzle of the print head associated with colors less distinctive than the color of the outer edges.

5. A segment as in claim 1 wherein the image first edge is a leading edge and the first registration fiducial mark is disposed on the print medium between the print medium leading edge and the image first edge.

6. A segment as in claim 5 wherein the image second edge is a lateral side edge and the second registration fiducial mark is disposed between a lateral side edge of the print medium and the image second edge.

7. A segment as in claim 6 comprising a third fiducial registration mark generated by the print head and extending laterally along the segment opposite and parallel to the second fiducial mark, the three fiducial marks together defining a print field.

8. A segment as in claim 7 including a plurality of photographic images generated by the print head in the print field, the images arranged in at least one transverse row wherein the images in the at least one transverse row have aligned leading edges and the first registration fiducial mark provides a reference for locating the first edge of each image with respect to the print medium leading edge.

9. A segment of print medium having transverse leading and trailing edges and opposite side edges, the segment having a printable surface for receiving an inkjet output of a print head, the segment further comprising:

a) a printed field comprising one or more photographic images generated by the print head;

b) a transverse fiducial registration mark generated by the print head defining a leading edge of the printed field and providing reference information for the location of a first transverse cut through the printed field; and c) a lateral fiducial registration mark generated by the print head orthogonal to the first fiducial mark defining a lateral edge of the printed field and providing reference information for the location of a lateral cut through the printed field.

10. A segment as in claim 9 including a pair of the lateral fiducial registration marks defining opposite lateral edges of the print field.

* * * * *